(12) United States Patent
Kim et al.

(10) Patent No.: US 9,503,837 B2
(45) Date of Patent: Nov. 22, 2016

(54) METHOD AND APPARATUS FOR PERFORMING HARQ PROCESS IN WIRELESS COMMUNICATION SYSTEM

(71) Applicant: LG ELECTRONICS INC., Se (KR)

(72) Inventors: Hak Seong Kim, Seoul (KR); Oh Soon Shin, Seoul (KR); Shan Ai Wu, Seoul (KR); Yo An Shin, Seoul (KR); Mo Chan Yang, Seoul (KR); E Rang Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 266 days.

(21) Appl. No.: 14/048,836

(22) Filed: Oct. 8, 2013

(65) Prior Publication Data

US 2014/0098719 A1    Apr. 10, 2014

Related U.S. Application Data

(60) Provisional application No. 61/710,780, filed on Oct. 8, 2012.

(51) Int. Cl.
| | |
|---|---|
| *H04W 4/00* | (2009.01) |
| *H04W 88/04* | (2009.01) |
| *H04W 4/08* | (2009.01) |
| *H04B 7/02* | (2006.01) |
| *H04L 5/00* | (2006.01) |
| *H04L 1/18* | (2006.01) |
| *H04W 52/02* | (2009.01) |
| *H04L 5/14* | (2006.01) |
| *H04L 1/00* | (2006.01) |

(52) U.S. Cl.
CPC .............. *H04W 4/005* (2013.01); *H04B 7/026* (2013.01); *H04L 1/1854* (2013.01); *H04L 5/0037* (2013.01); *H04L 5/0055* (2013.01); *H04L 5/0094* (2013.01); *H04W 4/008* (2013.01); *H04W 4/08* (2013.01); *H04W 88/04* (2013.01); *H04L 1/1812* (2013.01); *H04L 5/1469* (2013.01); *H04L 2001/0092* (2013.01); *H04W 52/0216* (2013.01); *H04W 52/0219* (2013.01)

(58) Field of Classification Search
CPC ................. H04W 4/005; H04W 88/04; H04W 4/08; H04W 4/008; H04L 1/1854; H04L 5/0094; H04L 5/0037; H04L 5/0055
USPC ......................................................... 370/280
See application file for complete search history.

(56) References Cited

U.S. PATENT DOCUMENTS

| | | | |
|---|---|---|---|
| 2009/0005104 A1* | 1/2009 | Wang et al. ................... | 455/522 |
| 2012/0028672 A1* | 2/2012 | Chen ..................... | H04W 52/48 |
| | | | 455/522 |

(Continued)

*Primary Examiner* — Yaotang Wang
(74) *Attorney, Agent, or Firm* — Dentons US LLP

(57) ABSTRACT

A method and an apparatus for performing hybrid automatic repeat request (HARQ) in a wireless communication system is provided. UEs that use the same application for D2D communications form a sharing group so that reliability of transmission of a physical uplink shared channel (PUSCH) and a physical uplink control channel (PUCCH) among terminals that perform the D2D communications is guaranteed. In addition, among the terminals that perform the D2D communications, uplink transmission points in time determined in accordance with TDD configuration are checked and determined (calculated) so that the PUSCH and the PUCCH are correctly transmitted and received.

14 Claims, 12 Drawing Sheets

(56) References Cited

U.S. PATENT DOCUMENTS

| 2012/0039241 A1* | 2/2012 | Seo ............................... 370/315 |
| 2013/0223356 A1* | 8/2013 | Khoshnevis ........ H04W 72/042 370/329 |
| 2013/0223398 A1* | 8/2013 | Li et al. ......................... 370/329 |
| 2015/0049732 A1* | 2/2015 | Xue et al. ...................... 370/330 |

* cited by examiner

METHOD AND APPARATUS FOR PERFORMING HARQ PROCESS IN WIRELESS COMMUNICATION SYSTEM

CROSS-REFERENCE TO RELATED APPLICATIONS

This application claims the benefit of priority of U.S. Provisional application 61/710,780 filed on Oct. 8, 2012, which is incorporated by reference in their entirety herein.

BACKGROUND OF THE INVENTION

1. Field of the Invention

The present invention relates to a wireless communication system, and more particularly, to a method and an apparatus for performing a hybrid automatic repeat request (HARQ) process in a wireless communication system for supporting inter-terminal communications.

2. Related Art

Recently, commercialization of a long term evolution (LTE) system as a next generation wireless communication system is supported in earnest. The LTE system is more rapidly spreading after necessity for supporting a large capacity service for demands of users as well as a voice service with high quality while guaranteeing activity of terminal users is recognized. The LTE system provides low transmission delay, a high transfer rate, high system capacity, and high coverage improvement.

On the other hand, the LTE system is developed to maintain compatibility with or coexist with a 2G communication system that is a global system for mobile communications (GSM) as a time division multiple access (TDMA) based communication technology and a 3G communication system that is a wideband code division multiple access (W-CDMA) based universal mobile telecommunication system (UMTS) in consideration of demands of a service provider that provides services to users and improvement of performance through improvement of a previously installed radio access network and an investment cost collection method for a previously invested wireless communication system.

In particular, recently, due to appearance of smart phones and tablet personal computers (PC), users of actual communication devices require services for easily obtaining or sharing desired information in desired places and at desired times. However, due to complexity or temporal delay of a wireless communication system, it is not easy for the wireless communication system to efficiently provide small but useful real time information for users in real life spaces.

On the other hand, a device to device (D2D) service is performed through D2D link among communication devices without a network such as a base station involved, which may be considered that the wireless communication system is desperately required to be developed and improved into a communication system for supporting an environment in which users may share and obtain various information items. Therefore, efficient data transmitting and receiving method and technology in the wireless communication system for supporting the D2D service are required.

SUMMARY OF THE INVENTION

The present invention provides a method and an apparatus for performing a hybrid automatic repeat request (HARQ) process for D2D communications in a wireless communication system.

The present invention also provides a method and an apparatus for transmitting and receiving data through a sharing group in a wireless communication system for supporting inter-terminal communications.

Still another object of the present invention is to provide a method and an apparatus for performing an HARQ process through uplink in a sub-frame determined in accordance with time division duplex (TDD) configuration in a wireless communication system for supporting inter-terminal communications.

DESCRIPTION OF EXEMPLARY EMBODIMENTS

Figure 1:
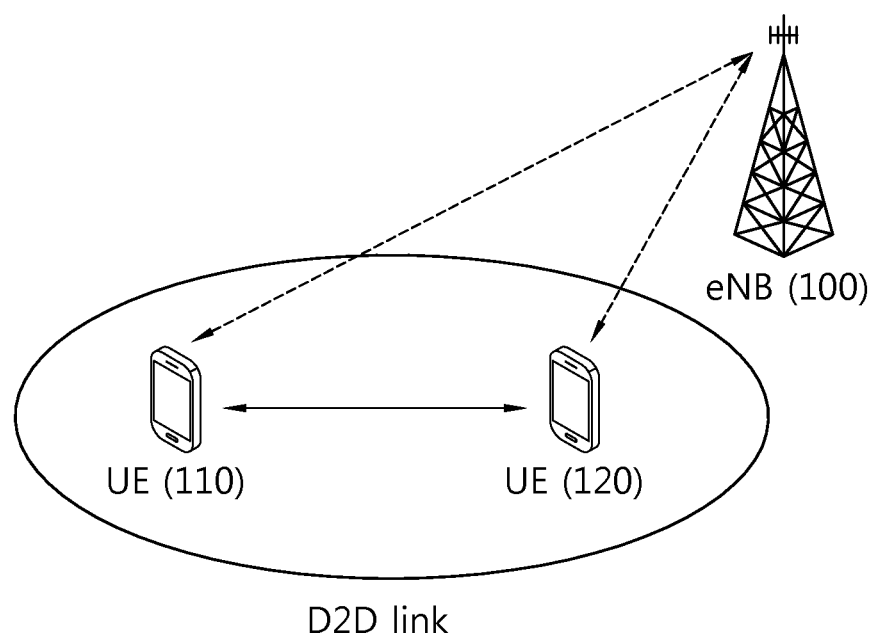
FIG. 1 is a view illustrating a concept of inter-terminal communications according to the present invention.

Hereinafter, embodiments of the present invention will be described in detail with reference to the accompanying drawings. Like reference numerals designate like elements throughout the specification. In the following description, description of related already known configurations and functions will be omitted when it is determined that the description blurs the subject matter of the present invention.

In the present specification, a communication network is described. Works may be performed on the communication network when a system (for example, a base station) for managing the corresponding communication network controls the network and transmits data or may be performed by terminals linked to the corresponding network.

Hereinafter, FIG. 1 is a view schematically illustrating a structure of a wireless communication system according to the present invention. A network structure of an evolved-universal mobile telecommunications system (E-UMTS) is disclosed. The E-UMTS system is referred to as a long term evolution (LTE) system or an LTE-advanced (A) system and is a packet based system for providing various communication services such as audio and packet data.

Referring to FIG. 1, an evolved-universal terrestrial radio access network (E-UTRAN) includes an evolved-NodeB (eNB) 100 for providing a control plane and a user plane to user equipments (UE) 110 and 120. The UEs 110 and 120 may be fixed or mobile and may be referred to as a mobile station (MS), an advanced MS (AMS), a user terminal (UT), a subscriber station (SS), and a wireless device.

The eNB 100 commonly refers to a station that communicates with the UEs 110 and 120 and may be referred to as a base station (BS), a base transceiver system (BTS), an access point, a femto-eNB, a pico-eNB, a home eNB, and a relay. The eNB 100 may provide services to terminals through at least one cell. The cell may mean a geographical region in which communication services are provided by the eNB 100 and a specific frequency band. The cell may mean a downlink frequency resource and an uplink frequency resource. The cell may mean a combination of the downlink frequency resource and an optional uplink frequency resource. In addition, the cell must be interpreted as indicating a partial region that the eNB 100 covers. The cell may be defined as a mega cell, a macro cell, a micro cell, a pico cell, and a femto cell in accordance with the size thereof. According to the present invention, the cell must be interpreted as including all of various coverage regions.

Hereinafter, according to the present invention, downlink means communications from the eNB 100 to the UEs 110 and 120 and uplink means communications from the UEs 110 and 120 to the eNB 100. In the downlink, a transmitter may be a part of the eNB 100 and a receiver may be a part of the UEs 110 and 120. In the uplink, a transmitter may be a part of the UEs 110 and 120 and a receiver may be a part of the eNB 100.

According to the present invention, various multiple access techniques such as code division multiple access (CDMA), time division multiple access (TDMA), frequency division multiple access (FDMA), orthogonal frequency division multiple access (OFDMA), single carrier-FDMA (SC-FDMA), OFDM-FDMA, OFDM-TDMA, and OFDM-CDMA may be used. In addition, a time division duplex (TDD) method in which the uplink and the downlink are transmitted at different times and a frequency division duplex (FDD) method in which the uplink and the downlink are transmitted at different frequencies may be used.

On the other hand, according to the present invention, physical control channels such as a physical downlink control channel (PDCCH), a physical control format indicator channel (PCFICH), a physical hybrid ARQ indicator channel (PHICH), and a physical uplink control channel (PUCCH) are used. Here, the PDCCH may carry resource allocations and transmission formats of a downlink shared channel (DL-SCH), resource allocation information of an uplink shared channel (UL-SCH), paging information on a physical control channel (PCH), system information on the DL-SCH, resource allocations of an upper layer control message such as random access responses transmitted to the PDSCH, a set of transmission power control commands on individual UEs in an arbitrary UE group, and activation of a voice over Internet protocol (VoIP). The PCFICH carries information on the number (that is, a size of a control region) of OFDM symbols used for transmitting control channels in sub-frames. The PHICH carries acknowledgement (ACK)/not-acknowledgement (NACK) feedback siganals that are response signals for HARQ for uplink transmission. The PUCCH carries uplink control information such as HARQ ACK/NACK, scheduling request, and CQI for downlink transmission.

Referring to FIG. 1 again, recently, in the wireless communication system, in order to satisfy rapidly increasing request for wireless data traffic, introduction of a small base station such as a femto cell or a pico cell and a device-to-device (D2D) technology of terminals directly transmitting and receiving traffic without an enhanced nodeB (eNB) involved are suggested.

In particular, D2D communications in which a cellular spectrum is uniformly used based on a cellular infra structure have advantages in various terms. For example, when a distance between D2D terminals is short, the terminals directly communicate with each other without the eNB involved so that load of the eNB may be reduced, transmission power may be reduced, and a frequency reuse factor may be increased. In terms of the transmission power, when the distance between the terminals is short, since communications may be performed with a smaller amount of power than that required when the traffic is transmitted to and received from the remote eNB, it is more effective. Since the D2D communications may be performed with a small amount of power, a number of D2D links may simultaneously communicate with each other in the same cell so that the frequency reuse factor may be increased.

Due to such advantages, recently, as a method of reducing load of a cellular communication network and saving communication resources, an interest in the D2D communications is increasing. As a result, the D2D communications have advantages such as a high bit rate, low delay, and low power consumption due to accessibility of user equipments (UE).

By utilizing the advantages of the D2D communications, according to the present invention, there is provided a method of retransmitting hybrid automatic repeat request (HARQ). In particular, an HARQ operation performed by sharing D2D UEs (DUE) is disclosed.

According to the present invention, there are provided LTE protocol based D2D transmission and a method of allocating and scheduling resources based on the eNB. In resource allocation, the eNB has complete control rights to resource allocations of respective D2D connections and provides the D2D UEs information on the scheduled resources through L1/L2 signaling such as the PDCCH, which will be described in detail in FIG. 2.

Figure 2:
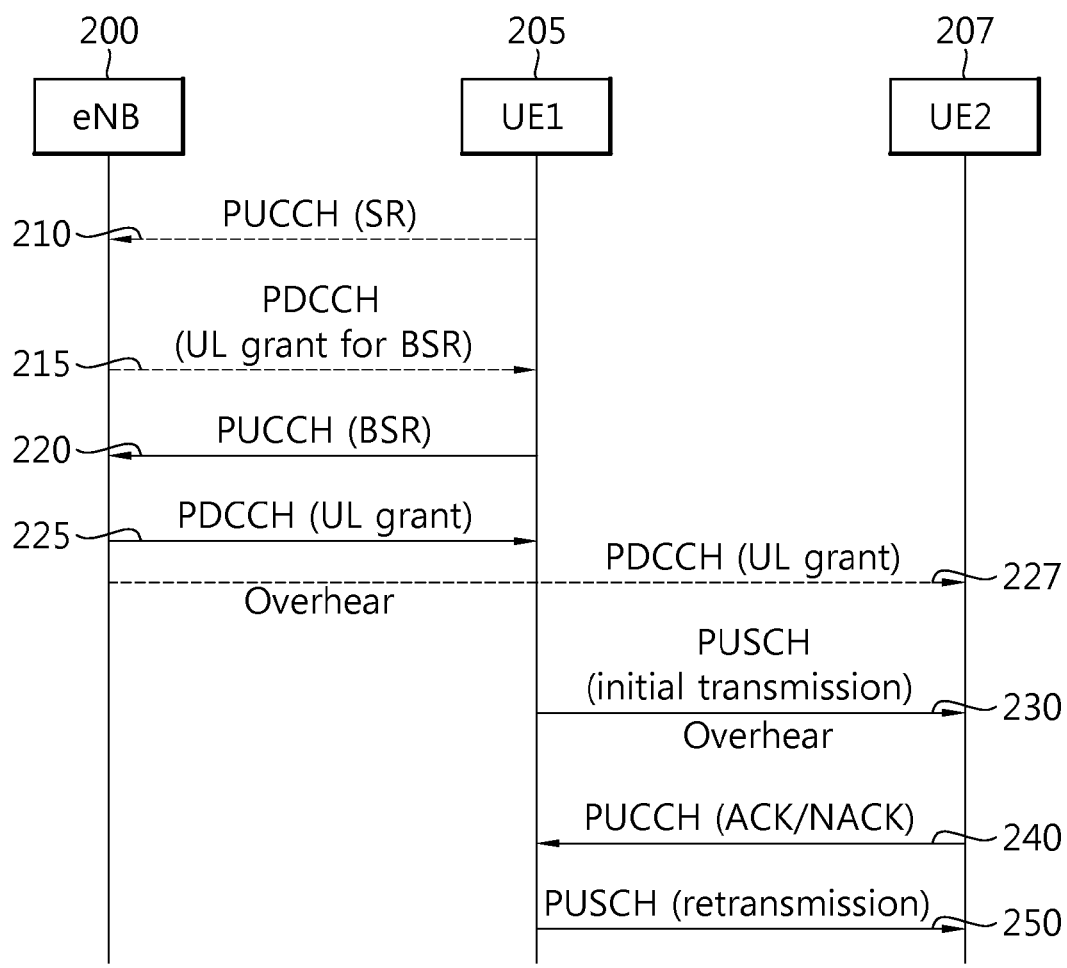
FIG. 2 is a view illustrating data transmission and reception processes of device to device (D2D) communications in a wireless communication system according to the present invention.

FIG. 2 is a view illustrating data transmission and reception processes of device to device (D2D) communications in a wireless communication system according to the present invention. In particular, FIG. 2 schematically illustrates resource allocation and data transmission processes of the D2D communications based on an LTE protocol. In terms of management of resource allocation, the eNB is centrally considered and the processes according to the present invention are based on LTE transmission processes and the following two assumptions.

① A UE1 and a UE2 configure the D2D connections and the UE1 has data to be transmitted to the UE2.

② The eNB has complete rights to the resource allocations.

Referring to FIG. 2, the UE1 205 informs the eNB 200 that it has data to be transmitted to the UE2 207 210. According to the LTE protocol, the UE1 may transmit buffer status report (BSR) information to the eNB through a physical uplink shared channel (PUSCH). When uplink resources for transmission of the BSR information are not provided, the UE1 may transmit one bit scheduling request (SR) information through a physical uplink control channel (PUCCH).

When the eNB receives SR signaling from the UE1, the eNB allocates the uplink resources for the UE1 to transmit the BSR information 215. After receiving the BSR information from the UE1 S220, the eNB allocates resources for data transmission between the UE1 and the UE2 225 and 227.

The present invention is not limited to a specific resource allocation algorithm. In addition, in the D2D communications, the eNB may periodically or non-periodically obtain cannel quality information (CQI) that represents a channel state of a D2D link between the UE1 and the UE2 through the PUCCH. The UE1 and the UE2 may estimate a channel through a sounding reference signal (SRS).

After allocating the resources, the eNB may deliver the PDCCH to the UE1 and the UE2. In an LTE system, blind decoding may be performed at a specific PDCCH point through an identity such as a cell radio network temporary identifier (C-RNTI). Therefore, there are provided two methods of informing the UE1 and the UE2 of a resource allocation result.

① Approach 1: The eNB transmits two independent PDCCHs to the UE1 and the UE2. The PDCCHs transmitted by the eNB to the UE1 and the UE2 in order to know that the UE1 and the UE2 must transmit and receive data for the allocated resources may have another downlink control information (DCI) type.

② Approach 2: The eNB transmits only one PDCCH to the UE1 and the UE2 having the C-RNTI of a transmitting UE. Therefore, it is necessary for the UE2 to know the C-RNTI of the UE1 in order to decode the PDCCH. The C-RNTI may be obtained in D2D connection processes. In comparison with the approach 1, in the approach 2, signaling overhead is reduced. However, blind decoding attempts are increased.

The wireless communication system as 3GPP LTE of the present invention uses blind decoding for PDCCH/EPDCCH detection. The blind decoding is a scheme in which a desired identifier is de-masked from a CRC of a PDCCH/EPDCCH (referred to as a candidate PDCCH/EPDCCH) to determine whether the PDCCH/EPDCCH is its own channel by performing CRC error checking.

An eNB determines a PDCCH/EPDCCH format according to DCI to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH/EPDCCH. The DCI means control information transmitted through a PDCCH/EPDCCH. The DCI includes uplink or downlink scheduling information or includes an uplink transmit (Tx) power control command for arbitrary UE groups. The DCI is differently used depending on its format, and it also has a different field that is defined within the DCI. Table 1 shows DCI according to a DCI format.

TABLE 1

| DCI FORMAT | DESCRIPTION |
| --- | --- |
| 0 | Used for the scheduling of a PUSCH (uplink grant) |
| 1 | Used for the scheduling of one PDSCH codeword |
| 1A | Used for the simplified scheduling of one PDSCH codeword and for a random access procedure reset by a PDCCH command |
| 1B | Used for the simplified scheduling of one PDSCH codeword using precoding information |
| 1C | Used for the simplified scheduling of one PDSCH codeword and the notification of a change of an MCCH |
| 1D | Used for precoding and the simplified scheduling of one PDSCH codeword including power offset information |

TABLE 1-continued

| DCI FORMAT | DESCRIPTION |
| --- | --- |
| 2 | Used for PDSCH scheduling for a UE configured in spatial multiplexing mode |
| 2A | Used for the PDSCH scheduling of a UE configured in large delay CDD mode |
| 2B | Used for Resource assignments for PDSCH using up to 2 antenna ports with UE-specific reference signals |
| 2C | Used for Resource assignment for PDSCH using up to 8 antenna ports with UE-specific reference signals |
| 2D | Used for Resource assignment for PDSCH using up to 8 antenna ports with UE-specific reference signals |
| 3 | Used for the transmission of a TPC command for a PUCCH and PUSCH including 2-bit power coordination |
| 3A | Used for the transmission of a TPC command for a PUCCH and PUSCH including single bit power coordination |

The DCI Format 0 indicates uplink resource allocation information, the DCI formats 1~2 indicate downlink resource allocation information, and the DCI formats 3 and 3A indicate uplink Transmit Power Control (TPC) commands for specific UE groups. The fields of the DCI are sequentially mapped to an information bit. For example, assuming that DCI is mapped to an information bit having a length of a total of 44 bits, a resource allocation field may be mapped to a 10th bit to 23rd bit of the information bit. The DCI may include resource allocation of the PDSCH (this is referred to as a downlink (DL) grant), resource allocation of a PUSCH (this is referred to as an uplink (UL) grant), a set of transmit power control commands for individual UEs in any UE group and/or activation of a voice over Internet protocol (VoIP).

After receiving the PDCCH from the eNB, the UE1 transmits data to the UE2 through the allocated resources 230.

On the other hand, in the LTE system, downlink and uplink data are transmitted through a physical downlink shared channel (PDSCH) and the PUSCH, respectively. In the D2D communications, it seems that the data may be transmitted through the PDSCH and the PUSCH. However, there exist various problems in transmitting the D2D traffic in downlink. In the LTE system, it is necessary for an UE to detect cell-specific reference signals (CRS) and to estimate a downlink channel in order to perform coherent demodulation. The D2D UE may not transmit the CRS as the eNB does and the transmitting UE generates interference with CRS resources so that a problem may be caused in the coherent demodulation. In addition, the PDCCH must be transmitted before the PDSCH in one sub-frame or a number of sub-frames. Therefore, double scheduling may be performed among the sub-frames.

Therefore, in the LTE system according to the present invention, the D2D traffic may be transmitted in uplink using an UE-specific reference signal. When the UP-specific reference signal is used, interference between the D2D UE and a cellular UE needs not be considered. In addition, the eNB informs the UE of allocated resource information before one sub-frame or a number of sub-frames in order to transmit the PUSCH. Continuously, in the LTE system, there is no problem of double scheduling between the PDCCH and the PUSCH.

After receiving the PDCCH from the eNB, the UE2 receives the data from the UE1 through the allocated resources 230. The UE2 transmits ACK/NACK feedback signals to the UE1 in accordance with whether the data is correctly received from the eNB 240.

In general, in the LTE system, the eNB transmits the ACK/NACK feedback signals through a physical hybrid ARQ indicator channel (PHICH) in accordance with whether the PUSCH transmitted by the UE is correctly received. According to the present invention, since the UE2 transmits the data to the UE1 through the PUSCH together with the cellular UE, it is difficult to multiplex and transmit the PHICH in the same sub-frame. Therefore, according to the present invention, the UE2 that performs the D2D communications may transmit the ACK/NACK feedback signals through the PUCCH.

That is, in the LTE system that supports the D2D communications according to the present invention, the ACK/NACK feedback signals for downlink transmission are transmitted through the PUCCH. For this purpose, in the wireless communication system according to the present invention, the PDCCH is transmitted including resources of the PDSCH and the PUCCH. In addition, unlike in cellular connection, in the D2D, the PDCCH and the PDSCH are transmitted in the same sub-frame and the PDCCH is transmitted before one sub-frame or a number of sub-frames from actual data transmission between the D2D. In this case, PUCCH resources for D2D ACK/NACK may collide with cellular ACK/NACK. In order to solve the problem, according to the present invention, the following two methods may be used.

① Method 1: A specific resource is allocated to the D2D PUCCH.

② Method 2: Alternative carrier scheduling is performed using a carrier aggregation (CA) technology.

The allocated carrier is used for transmitting the PDCCHs related to the D2D traffic. In the above methods, the D2D ACK/NACK may be transmitted in a different carrier from the cellular ACK/NACK. A guard band between time division duplex (TTD) uplink and downlink for the D2D traffic may be used.

The UE1 receives the ACK/NACK feedback signals from the UE2 and determines whether the data is to be retransmitted 250. In the LTE system, since synchronized HARQ is used in uplink, both the UE1 and the UE2 know the sub-frames to which the retransmitted data is transmitted and from which the retransmitted data is received. In FIG. 2, LTE protocol based D2D transmission and HARD are described. That is, it is described how the D2D signaling is configured and the data is transmitted in the LTE system.

Figure 3:
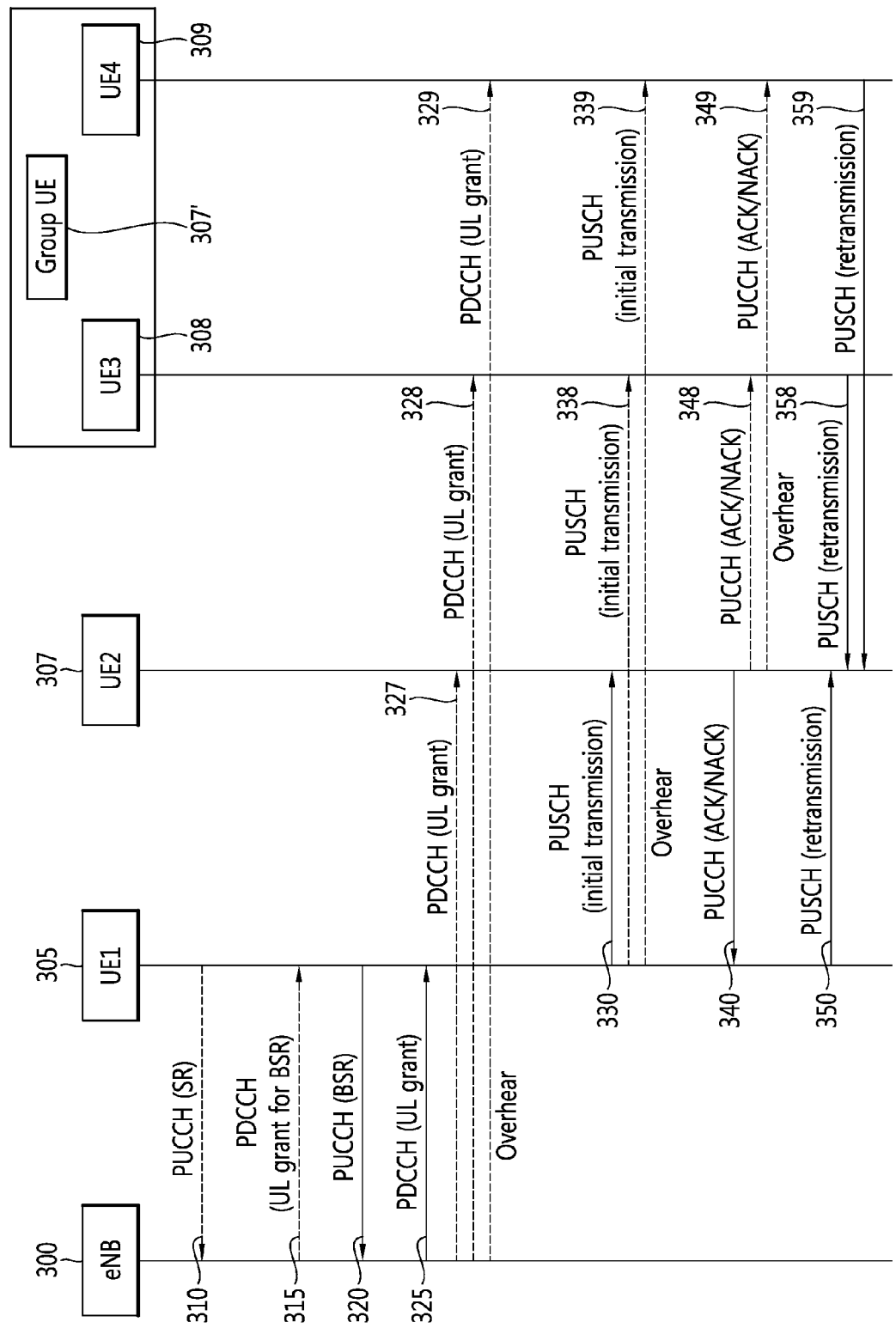
FIG. 3 is a view illustrating data transmission and reception processes of device to device (D2D) communications through a sharing group according to an exemplary embodiment of the present invention.

In FIG. 3, a method of cooperatively configuring D2D HARQ based on the above D2D HARQ processes will be described.

First, in a common cellular system, HARQ is configured in processes of transmitting and receiving data based on the eNB. Therefore, when data transmission fails first, a remarkably large amount of resources are used for data HARQ in terms of time, frequency, and power. When the non-cooperative D2D HARQ processes suggested in the present invention are used, it is difficult to retransmit data. In particular, when data transmission is not smoothly performed between neighboring D2D UEs, it is noted that it is difficult to smoothly perform data HARQ between the neighboring D2D UEs. It is because it is difficult to perform data HARQ in a conventional link considering that a change in a channel environment between the neighboring D2D UEs is small.

Therefore, according to the present invention, in order to solve non-effectiveness of use of resources of HARQ processes and HARQ problem of the non-cooperative D2D HARQ processes in a conventional cellular, D2D group UE based cooperative HARQ processes will be provided.

According to the present invention, there is provided a method of forming a group by UEs that use the same application and actively using the D2D communications through the cooperative group. In addition, the D2D UEs may cooperatively retransmit data in the group. The processes according to the present invention are based on the LTE transmission processes and the following assumptions.

① The UE1 and the UE2 configure the D2D connections and the UE1 has data to be transmitted to the UE2.

② The group UEs that form the group for a common purpose together with the UE1 and the UE2 that currently transmit and receive data may overhear and retransmit signals of the UE1 and the UE2.

③ The eNB has complete rights to the resource allocations.

Referring to FIG. 3, the eNB allocates uplink resources to the UE1 through the PDCCH 325. Here, information on allocation of the scheduled resources is provided to the D2D terminals through the L1/L2 signaling such as the PDCCH. That is, the UE1, the UE2, and the D2D UEs directly transmit and receive data using the allocated resources under the command of the eNB. Here, all the communications may be performed in the D2D communications among the UEs. However, among the UEs, actual data may be transmitted, minimum control information on the data may be transmitted and received, and the control information of the eNB and transmission and reception of the data may be supported.

In addition, in resource allocation to the UE1, the UE2 and a UE3 and a UE4 that are grouped overhear corresponding signals 327, 328, and 329 because the UE2, the UE3, and the UE4 may perform blind decoding at a specific PDCCH receiving point through the identity such as the C-RNTI in the LTE system. That is, the UE2, the UE3, and the UE4 must know the C-RNTI of the UE1 in order to overhear the signal of the UE1. In processes of forming the D2D group, the UEs that belong to the group may obtain mutual C-RNTIs.

For example, according to the present invention, the eNB may check a plurality of servable UEs in a cell and may distinguish UEs that support the D2D communications from UEs that support cellular communications through capability processes of the checked UEs. At this time, resources for the distinguished D2D communications and control information for supporting the D2D service may be allocated to the distinguished UEs. In a Radio resource control (RRC) connection process, RNTI information for blind decoding of the PDCCH may be obtained in response to service requests of terminals. Here, D2D only RNTI as well as C-RNTI may be used as the RNTI.

Information on the shared RNTI may be received through response messages during signaling with the eNB in the UE capability processes of the respective terminals or information on the shared RNTI for the D2D service may be received through additional signaling. Here, the D2D UEs transmit and receive data regardless of the eNB in accordance with service characteristics thereof. Therefore, according to the present invention, D2D communications may be performed among the UEs while minimizing unnecessary communications of the eNB. That is, the information on the shared RNTI may be transmitted and received among the D2D UEs.

On the other hand, the processes of 310 and 320 of FIG. 3 are the same as the processes 210 and 220 of FIG. 2.

The UE1 transmits data to the UE2 through the PUSCH using the allocated resources 330. At this time, the UE3 and the UE4 that are sharing groups overhear the PUSCH signal transmitted to the UE2 and attempt to decode the PUSCH signal 338 and 339.

On the other hand, the UE2 must transmit the ACK/NACK feedback signals to the UE1 through the PUCCH in accordance with whether the data is correctly received 340. At this time, the UE3 and the UE4 simultaneously overhear the PUCCH to confirm the ACK/NACK feedback signals 348 and 349. Here, when the UE2 transmits the NACK feedback signal, the UE1 retransmits data through the PUSCH 350 and the UE3 and the UE4 retransmit the corresponding data to the UE2 through the allocated PUSCH signal 358 and 359.

As described above, the UE1 D2D link configured with the UE2 and the UEs that belong to the sharing group receive and check specific resources of the PUCCH, for example, D2D ACK/NACK of the UE2 transmitted through a protective band between TDD uplink and downlink for D2D traffic and determine HARQ of the PUSCH. In addition, in sub-frames determined in accordance with transmission of the ACK/NACK feedback signals, the UE2 checks HARQ data through the PUSCH transmitted from the UE1 and the UEs that belong to the sharing group and supports the D2D service.

Hereinafter, in the wireless communication system according to the present invention, time flow for optimizing efficiency of HARQ will be described.

Figure 4:
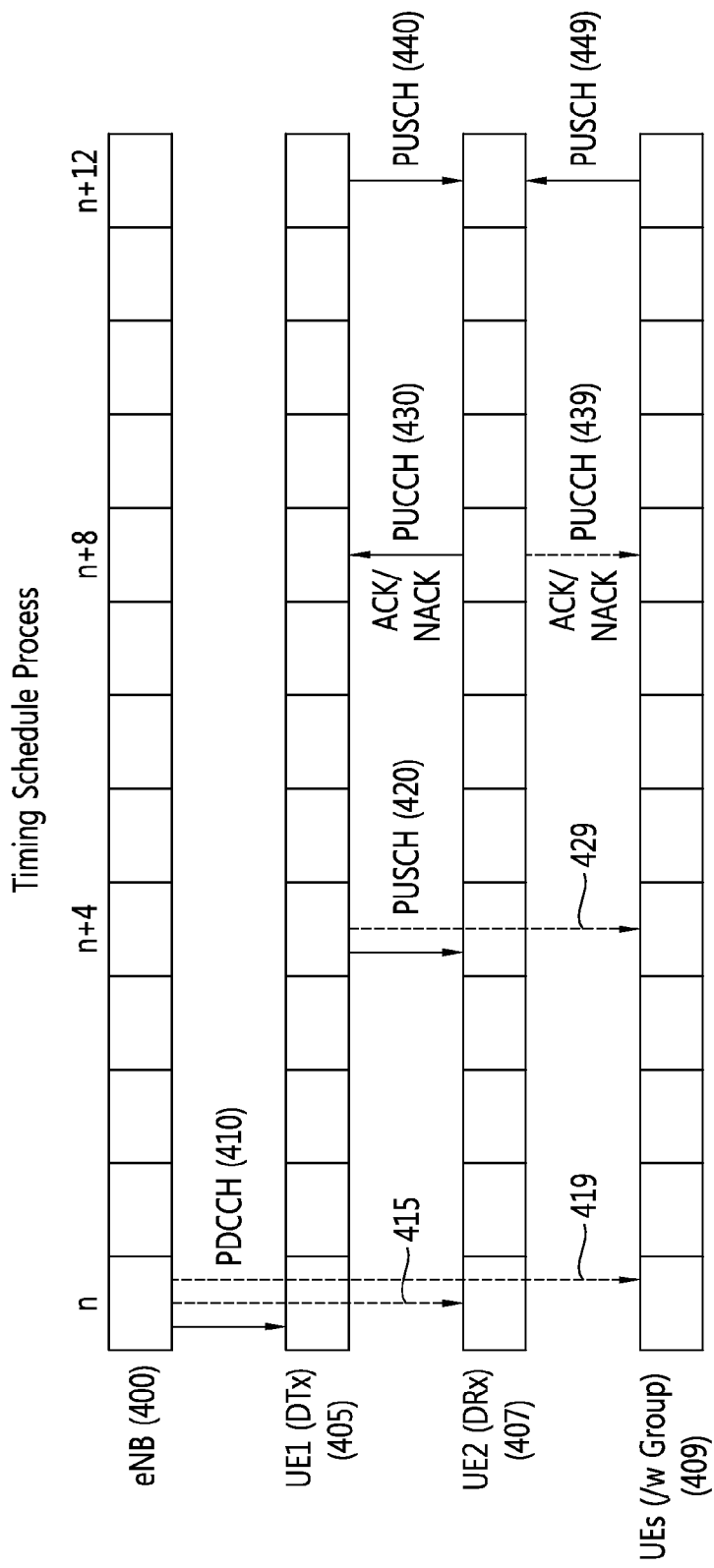
FIG. 4 is a view illustrating flow of time to retransmit hybrid automatic repeat request (HARQ) in a frequency division duplex (FDD) environment.

FIG. 4 is a view illustrating a D2D cooperative HARQ technology in a frequency division duplex (FDD) environment.

Referring to FIG. 4, in a downlink nth sub-frame, the UE1, the UE2, and the group UEs that configure the D2D receive the PDCCH signal transmitted by the eNB 410, 415, and 419. Here, the UE2 and the group UEs obtain mutual C-RNTIs in a period where the D2D group is formed together with the UE1. Therefore, the UE1, the UE2, and the group UEs that receive the PDCCH perform blind decoding using the C-RNTI.

The UE1 transmits the PUSCH signal to the UE2 through the uplink resources obtained through the PDCCH in an (n+4)th sub-frame 420. The group UEs overhear the PUSCH signal when the PUSCH signal is transmitted by the UE1 and store corresponding data information in a buffer 429.

In an (n+8)th sub-frame, the UE2 transmits the ACK/NACK feedback signals to the UE1 in accordance with whether the PUSCH is correctly received 430. The group UEs overhear the ACK/NACK feedback signals transmitted by the UE2 in the (n+8)th sub-frame 439. Here, when the UE2 transmits the NACK feedback signal, in an (n+12)th sub-frame, the UE1 and the group UEs retransmit the PUSCH signal to the UE2 440 and 449.

Therefore, the UE2 receives the PUSCH signal retransmitted from the UE1 and the group UEs to guarantee reliability of D2D data. That is, cooperative HARQ is performed among the D2D group UEs so that reliability of data transmission is guaranteed.

As described above, in FDD, downlink sub-frames and uplink sub-frames correspond to each other one-to-one. Therefore, one sub-frame only has to transmit a response to one sub-frame of an opposite link. Meanwhile, in the TDD, the downlink sub-frames and the uplink sub-frames do not necessarily correspond to each other one-to-one. That is, in the configuration of the TDD, one uplink sub-frame may perform ACK/NACK on a number of downlink sub-frames in accordance with scheduling determination. At this time, decoding results of a number of downlink transmission blocks from the downlink transmission blocks may be united to one HARQ ACK/NACK feedback signal transmitted by uplink.

Tables 2 and 3 indicate transmission sub-frames of ACK/NACK timing in downlink/uplink. At this time, the ACK/NACK transmission timing varies with a determined index.

For example, it is assumed that the eNB schedules terminals in two continuous sub-frames and the terminals miss PDCCH transmission of a first sub-frame and successfully decode data transmitted in a second sub-frame. When there is no additional information, the terminals will transmit the ACK feedback signal under the assumption that they are scheduled only in the second sub-frame and the eNB will interpret the ACK feedback signal as the terminals being successfully received in the two sub-frames. In order to avoid such an error, according to the present invention, downlink allocation indices for scheduling allocations are included in the PDCCH to be transmitted. The downlink allocation indices inform the terminals of ACK feedback signals for what number of transmissions are to be united. When the number of transmissions actually received by the downlink allocation indices is different from the number of transmissions actually received by the terminals, the terminals determine that they did not receive at least one scheduling not to transmit the HARQ ACK. That is, it is possible to prevent the ACK feedback signal from being transmitted for transmission of data that is not received.

Table 2 is downlink ACK/NACK timing k for TDD and Table 3 is uplink ACK/NACK timing k for TDD.

TABLE 2

| TDD UL/DL | Subframe index n | | | | | | | | | |
|---|---|---|---|---|---|---|---|---|---|---|
| Configuration | 0 | 1 | 2 | 3 | 4 | 5 | 6 | 7 | 8 | 9 |
| 0 | — | — | 4 | 7 | 6 | — | — | 4 | 7 | 6 |
| 1 | — | — | 4 | 6 | — | — | — | 4 | 6 | — |
| 2 | — | — | 6 | — | — | — | — | 6 | — | — |
| 3 | — | — | 6 | 6 | 6 | — | — | — | — | — |
| 4 | — | — | 6 | 6 | — | — | — | — | — | — |
| 5 | — | — | 6 | — | — | — | — | — | — | — |
| 6 | — | — | 4 | 6 | 6 | — | — | 4 | 7 | — |

TABLE 3

| TDD UL/DL | Subframe index n | | | | | | | | | |
|---|---|---|---|---|---|---|---|---|---|---|
| Configuration | 0 | 1 | 2 | 3 | 4 | 5 | 6 | 7 | 8 | 9 |
| 0 | 4 | 6 | — | — | — | 4 | 6 | — | — | — |
| 1 | 7 | 6 | — | — | 4 | 7 | 6 | — | — | 4 |
| 2 | 7 | 6 | — | 4 | 8 | 7 | 6 | — | 4 | 8 |
| 3 | 4 | 11 | — | — | — | 7 | 6 | 6 | 5 | 5 |
| 4 | 12 | 11 | — | — | 8 | 7 | 7 | 6 | 5 | 4 |
| 5 | 12 | 11 | — | 9 | 8 | 7 | 6 | 5 | 4 | 3 |
| 6 | 7 | 7 | — | — | — | 7 | 7 | — | — | 5 |

The Table 2 illustrates an index $k_{PHICH}$ that indicates PHICH timing considered in a current TDD. Here, $k_{PHICH}$ means that the PHICH is transmitted in a sub-frame #n+$k_{PHICH}$ after a sub-frame #n that is a UL sub-frame. For example, when TDD configuration is 0, when UL in a sub-frame #2 the PHICH is transmitted in a sub-frame #6. On the other hand, in the Table 3, when the terminals receive the PDCCH (for example, DL SPS release PDCCH) that requires the PDCH or the ACK/NACK feedback signals in the sub-frame #n, the ACK/NACK feedback signals are transmitted in a sub-frame n+k(n). The respective values of the Table 3 represent the k(n) values. For example, in the case where UL-DL configuration is 0, when the PDSCH is received in a sub-frame #0, the ACK/NACK feedback signals are transmitted in a sub-frame #4 after four sub-frames.

In FIGS. 5 to 10, in an LTE protocol based communication environment, TDD HARQ timing will be described. In particular, an HARQ timing TDD environment cooperative in the D2D communications according to the present invention will be disclosed.

Figure 5:
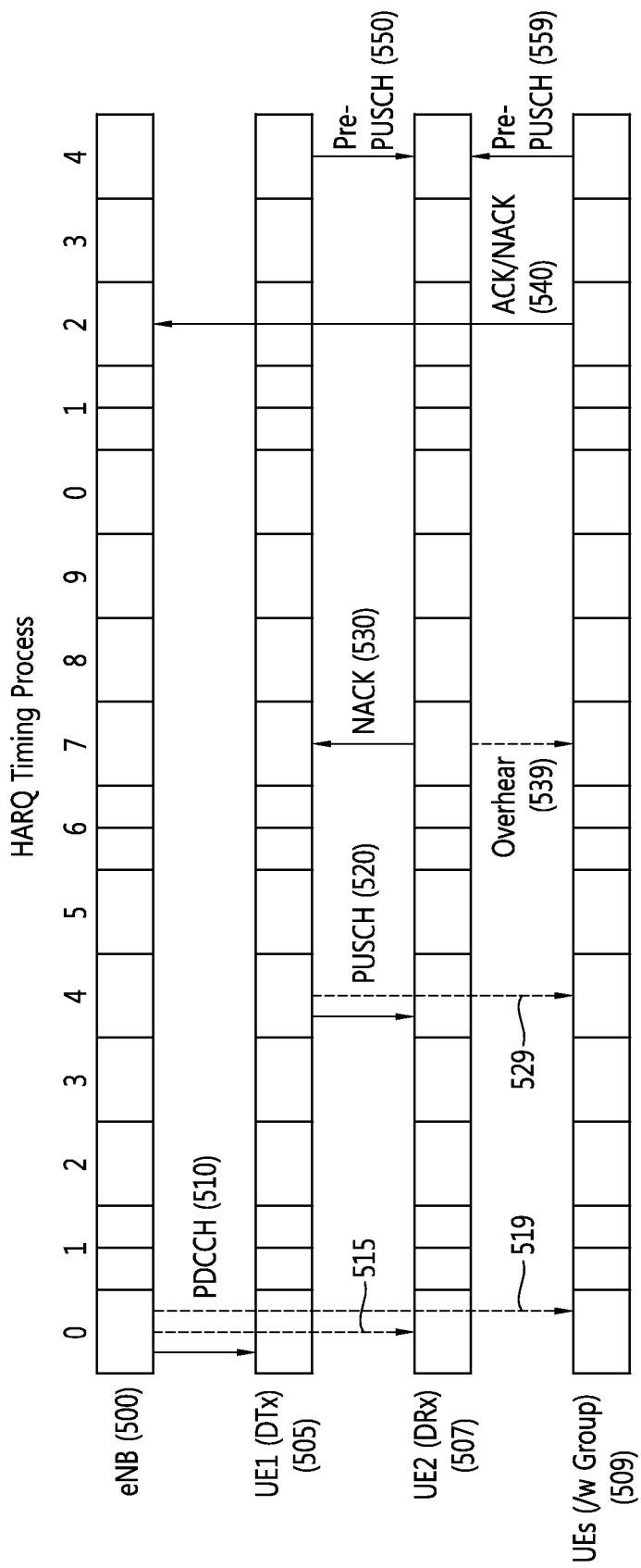
FIGS. 5 to 10 are views illustrating flow of time to retransmit HARQ in a time division duplex (TDD) environment according to an exemplary embodiment of the present invention.

FIG. 5 illustrates a case in which TDD configuration is 0 according to an example of the present invention. In FIG. 5, D2D group UE based cooperative HARQ is described.

Referring to FIG. 5, the eNB transmits UL scheduling information required for the UE1 transmitting data to the UE2 in a sub-frame #0 and transmits UL scheduling information required for the UE2 transmitting the ACK/NACK feedback signals to the UE1 through the PUCCH in a sub-frame #7. In addition, the eNB transmits UL scheduling information required for the group UEs transmitting the data to the eNB in a sub-frame #2 510, 515, and 519. The eNB is in charge of scheduling for the respective UEs to grasp in which sub-frame data transmission is performed. Therefore, the eNB recognizes information on UL scheduling and resources and timing of the corresponding UEs.

Here, the UE1, the UE2, and the group UEs may perform uplink transmission in uplink ACK/NACK timing kth sub-frames determined in accordance with the sub-frames #0, #1, #5, and #6 in the case where the TDD configuration is 0 as illustrated in the Table 3. For example, the UE1, the UE2, and the group UEs transmit the data and the ACK/NACK feedback signals through the PUSCH and the PUCCH to transmit and receive the data and the ACK/NACK feedback signals in the sub-frames #4, #7, #9, and #12 that are the uplink ACK/NACK timing kth sub-frames determined in accordance with the sub-frames #0, #1, #5, and #6 in the case where the TDD configuration is 0.

The UE1 that received the PDCCH in the sub-frame #0 transmits PUSCH data to the UE2 in a sub-frame #4 520 and the group UEs overhear the signal 529.

After determining whether the PUSCH data is correctly received, the UE2 transmits HARQ ACK/NACK feedback signals to the UE1 in the sub-frame #7 530. Here, the group UEs overhear the HARQ NACK feedback signal transmitted from the UE2 to the UE1 in the sub-frame #7 539.

On the other hand, the group UEs receive and determine the PUSCH data transmitted to the UE2 in the sub-frame #4. For example, the group UEs determine whether the ACK signal is transmitted to the eNB when the PUSCH data is correctly received and the NACK feedback signal is transmitted to the eNB when the PUSCH data is not correctly received in a sub-frame #12 (a second sub-frame of a next frame) 540. Here, the group UEs receive and determine the HARQ ACK/NACK feedback signals transmitted to the UE1 in the sub-frame #7 to guarantee reliability of transmission of the HARQ ACK/NACK feedback signals of the eNB in the sub-frame #12 (the second sub-frame of the next frame).

The UE1 that received the NACK feedback signal from the UE2 retransmits the PUSCH data to the UE2 in the sub-frame #4 550. At this time, the group UEs also retransmit the PUSCH data to the UE2 in the sub-frame #4 559. That is, when the UE2 transmitted the NACK feedback signal to the UE1 in the sub-frame #7, the group UEs may overhear the corresponding signal 539 and may cooperatively retransmit the PUSCH data together with the UE1 in the next sub-frame #4 where uplink transmission may be performed.

Figure 6:
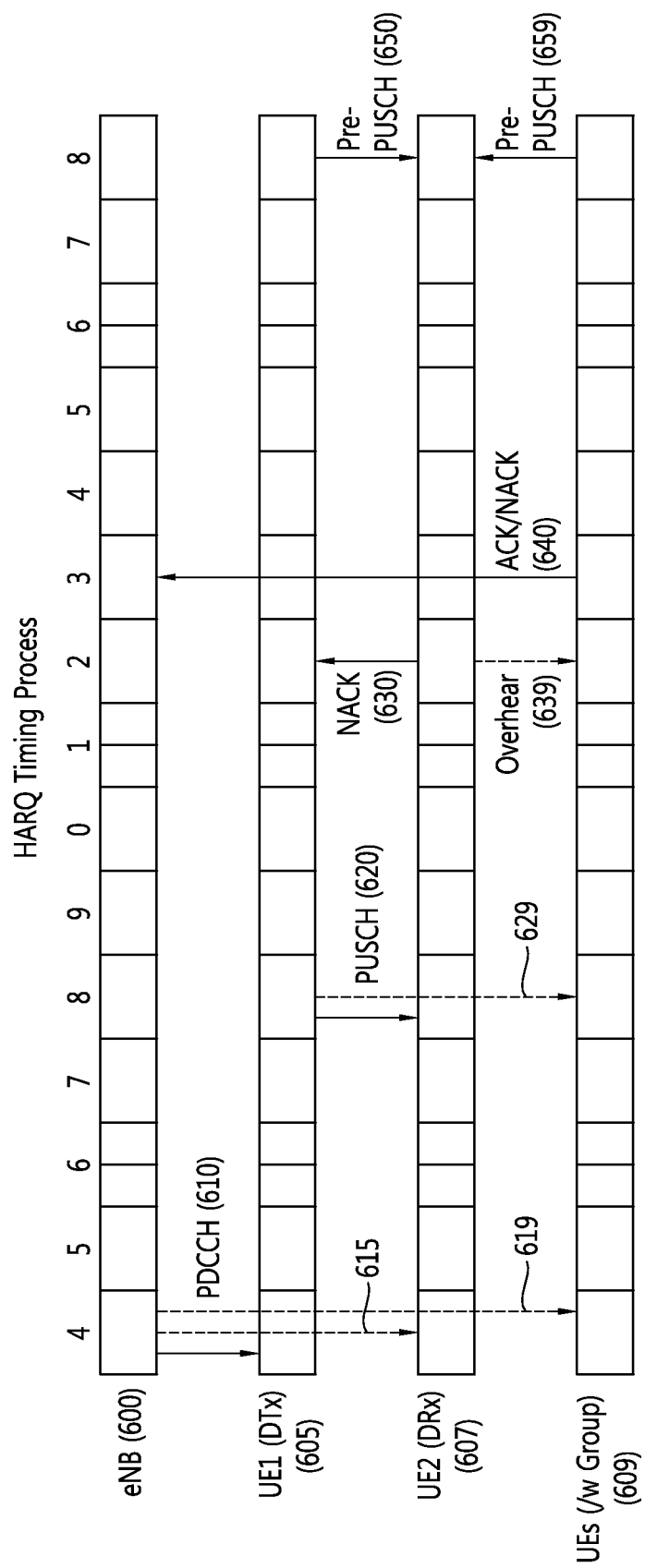

FIG. 6 illustrates a case in which TDD configuration is 1 according to an example of the present invention. In FIG. 6, D2D group UE based cooperative HARQ is described.

Referring to FIG. 6, the eNB transmits UL scheduling information required for the UE1 transmitting data to the UE2 in the sub-frame #4 and transmits UL scheduling information required for the UE2 transmitting the ACK/NACK feedback signals to the UE1 through the PUCCH in the sub-frame #2. In addition, the eNB transmits UL scheduling information required for the group UEs transmitting the data to the eNB in a sub-frame #3 610, 615, and 619. According to the present invention, downlink transmission may be performed in the sub-frames #0, #1, #4, #5, and #6 in the case where the TDD configuration is 1 and an HARQ operation may be performed through the PUSCH and the PUCCH in uplink ACK/NACK timing kth sub-frames determined in accordance with the sub-frames #0, #1, #4, #5, and #6 in the case where the TDD configuration is 1. For example, PDCCH transmission is described to be performed in the sub-frame #4.

The UE1 that received the PDCCH in the sub-frame #4 transmits PUSCH data to the UE2 in a sub-frame #8 and the group UEs overhear the signal 620 and 629.

After determining whether the PUSCH data is correctly received, the UE2 transmits HARQ ACK/NACK feedback signals to the UE1 in the sub-frame #2 in accordance with whether the PUSCH data is correctly received 630. Here, the group UEs overhear the HARQ NACK feedback signal transmitted from the UE2 to the UE1 in the sub-frame #2 639.

On the other hand, the group UEs that received the PUSCH data in the sub-frame #8 determine the PUSCH data to transmit the ACK feedback signal to the eNB in the sub-frame #3 where uplink transmission may be performed when the PUSCH data is correctly received and to transmit the NACK feedback signal to the eNB in the sub-frame #3 where uplink transmission may be performed when the PUSCH data is not correctly received 640. The group UEs receive and determine the HARQ ACK/NACK feedback signals transmitted to the UE1 in the sub-frame #8 to guarantee reliability of transmission of the HARQ ACK/NACK feedback signals of the eNB.

The UE1 that received the NACK feedback signal from the UE2 retransmits the PUSCH data to the UE2 in the sub-frame #8 650. At this time, the group UEs also retransmit the PUSCH data to the UE2 in the sub-frame #8 659. That is, when the UE2 transmitted the NACK feedback signal to the UE1 in the sub-frame #2, the group UEs may overhear the corresponding signal 639 and may cooperatively retransmit the PUSCH data together with the UE1 in the sub-frame #8 650 and 659.

Figure 7:
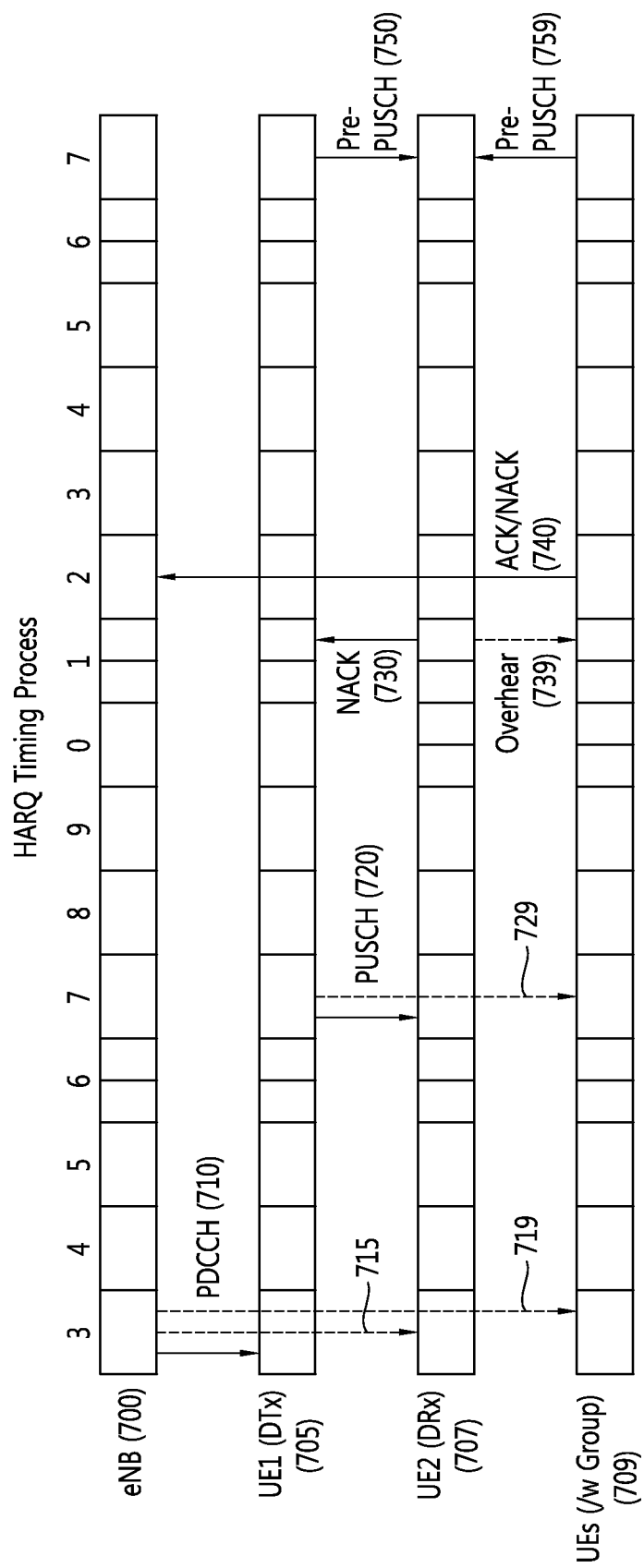

FIG. 7 illustrates a case in which TDD configuration is 2 according to an example of the present invention. In FIG. 7, D2D group UE based cooperative HARQ is described.

Referring to FIG. 7, the eNB transmits UL scheduling information required for the UE1 transmitting data to the UE2 in the sub-frame #3 and transmits UL scheduling information required for the UE2 transmitting the ACK/NACK feedback signals to the UE1 through the PUCCH in the sub-frame #1. In addition, the eNB transmits UL scheduling information required for the group UEs transmitting the data to the eNB in a sub-frame #2 710, 715, and 719. According to the present invention, downlink transmission may be performed in the sub-frames #0, #1, #3, #4, #5, #6,

8, and #9 in the case where the TDD configuration is 2 and an HARQ operation may be performed through the PUSCH and the PUCCH in uplink ACK/NACK timing kth sub-frames determined in accordance with the sub-frames #0, #1, #3, #4, #5, #6, #8, and #9 in the case where the TDD configuration is 2.

The UE1 that received the PDCCH in the sub-frame #3 transmits PUSCH data to the UE2 in the sub-frame #7 and the group UEs overhear the signal 720 and 729.

After determining whether the PUSCH data is correctly received, the UE2 transmits HARQ ACK/NACK feedback signals to the UE1 in the sub-frame #1 in accordance with whether the PUSCH data is correctly received 730. Here, the ACK feedback signal is transmitted to the eNB in the sub-frame #2 when the group UEs correctly received the PUSCH data in the sub-frame #7 and the NACK feedback signal is transmitted to the eNB in the sub-frame #2 when the group UEs did not correctly receive the PUSCH data in the sub-frame #7 740.

The UE1 that received the NACK feedback signal from the UE2 retransmits the PUSCH data to the UE2 in the sub-frame #7 750. At this time, the group UEs also retransmit the PUSCH data to the UE2 in the sub-frame #7 759. According to the present invention, the group UEs that overheard the NACK signal transmitted from the UE2 to the UE1 in the sub-frame #1 739 cooperatively retransmit the PUSCH data together with the UE1 in the sub-frame #7 750 and 759.

Figure 8:
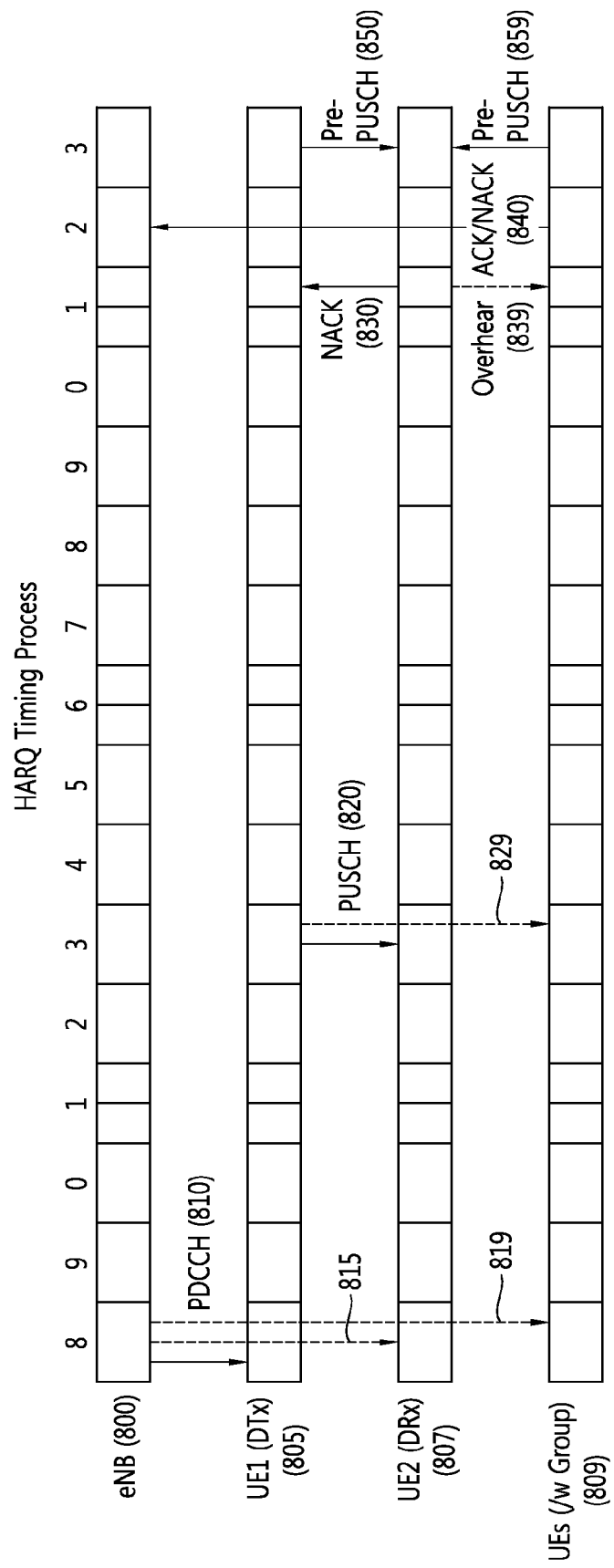

FIG. 8 illustrates a case in which TDD configuration is 3 according to an example of the present invention. In FIG. 8, D2D group UE based cooperative HARQ is described.

Referring to FIG. 8, the eNB transmits UL scheduling information required for the UE1 transmitting data to the UE2 in the sub-frame #8 and transmits UL scheduling information required for the UE2 transmitting the ACK/NACK feedback signals to the UE1 through the PUCCH in the sub-frame #1. In addition, the eNB transmits UL scheduling information required for the group UEs transmitting the data to the eNB in a sub-frame #2 810, 815, and 819.

The UE1 that received the PDCCH in the sub-frame #8 checks sub-frames in which uplink transmission may be performed to transmit PUSCH data to the UE2 in the sub-frame #3 820. At this time, the group UEs overhear the PUSCH data transmitted to the UE2 829.

On the other hand, the UE2 that received the PUSCH data in the sub-frame #3 transmits the HARQ ACK/NACK feedback signals to the UE1 in the next sub-frame #1 where uplink transmission may be performed in accordance with whether the PUSCH data is correctly received 830. Here, the group UEs overhear the HARQ NACK feedback signal transmitted from the UE2 to the UE1 in the sub-frame #1 839.

In addition, the group UEs that received the PUSCH data in the sub-frame #4 determine the PUSCH data to transmit the ACK feedback signal to the eNB in the sub-frame #2 when it is determined that the PUSCH data is correctly received and to transmit the NACK feedback signal to the eNB in the sub-frame #2 when it is determined that the PUSCH data is not correctly received 840.

The UE1 that received the NACK feedback signal from the UE2 retransmits the PUSCH data to the UE2 in the sub-frame #3 where uplink transmission may be performed 850. At this time, the group UEs that overheard the previous NACK feedback signal also retransmit the PUSCH data to the UE2 in the sub-frame #3 859. That is, when the UE2 transmitted the NACK feedback signal to the UE1 in the sub-frame #1, the group UEs overhear the signal 839 and cooperatively retransmit the PUSCH data together with the UE1 in the sub-frame #3 850 and 859.

Figure 9:
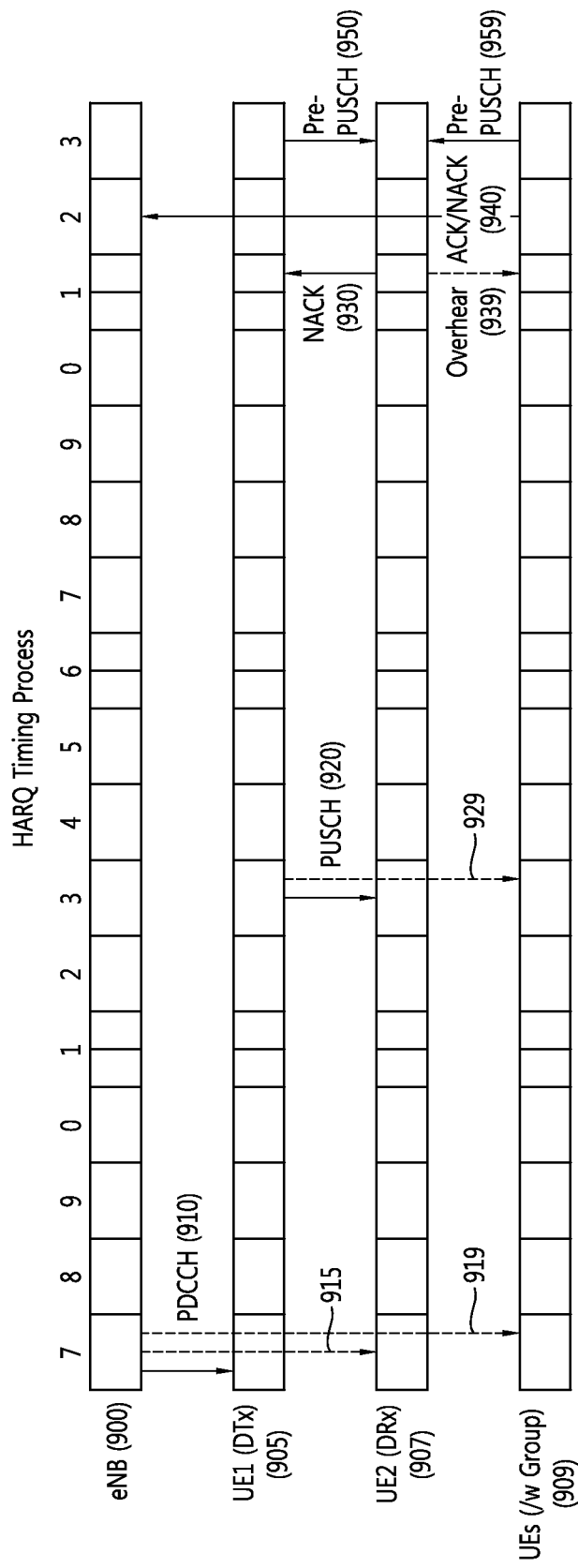

FIG. 9 illustrates a case in which TDD configuration is 4 according to an example of the present invention. In FIG. 9, D2D group UE based cooperative HARQ is described.

Referring to FIG. 9, the eNB transmits UL scheduling information required for the UE1 transmitting data to the UE2 in the sub-frame #7 and transmits UL scheduling information required for the UE2 transmitting the ACK/NACK feedback signals to the UE1 through the PUCCH in the sub-frame #1. In addition, the eNB transmits UL scheduling information required for the group UEs transmitting the data to the eNB in the sub-frame #2 910, 915, and 919. According to the present invention, downlink transmission may be performed in the sub-frames #0, #1, #4, #5, #6, #7, #8, and #9 in the case where the TDD configuration is 4 and an HARQ operation may be performed through the PUSCH and the PUCCH in uplink ACK/NACK timing kth sub-frames determined in accordance with the sub-frames #0, #1, #4, #5, #6, #7, #8, and #9 in the case where the TDD configuration is 4.

The UE1 that received the PDCCH in the sub-frame #7 transmits PUSCH data to the UE2 in the sub-frame #3 where uplink transmission may be performed and the group UEs overhear the signal 920.

After determining whether the PUSCH data is correctly received, the UE2 transmits the HARQ ACK/NACK feedback signals to the UE1 in the next sub-frame #1 where uplink transmission may be performed in accordance with whether the PUSCH data is correctly received 930. In addition, the ACK feedback signal is transmitted to the eNB in the sub-frame #2 when the group UEs correctly received the PUSCH data in the sub-frame #3 and the NACK feedback signal is transmitted to the eNB in the sub-frame #2 when the group UEs did not correctly receive the PUSCH data in the sub-frame #3 940.

The UE1 that received the NACK feedback signal from the UE2 retransmits the PUSCH data to the UE2 in the sub-frame #3 950. At this time, the group UEs also retransmit the PUSCH data to the UE2 in the sub-frame #7 959. According to the present invention, when the UE2 transmitted the NACK feedback signal to the UE1 in the sub-frame #1, the group UEs overhear the signal 939 and cooperatively retransmit the PUSCH data together with the UE1 in the sub-frame #3 950 and 959.

According to an example of the present invention, when the TDD configuration is 5, since resources for UL allocations support only one UL sub-frame in one radio-frame, there are no gains of resources for transmissions of the ACK/NACK feedback signals of the group UEs. Therefore, it is difficult to perform cooperative HARQ in the corresponding configuration. Therefore, when the cooperative HARQ is configured according to the present invention, the eNB may selectively exclude configuration in which the TDD configuration is 5. Therefore, the eNB performs the TDD configuration in consideration of efficiency of the HARQ operation of the group UEs.

Figure 10:
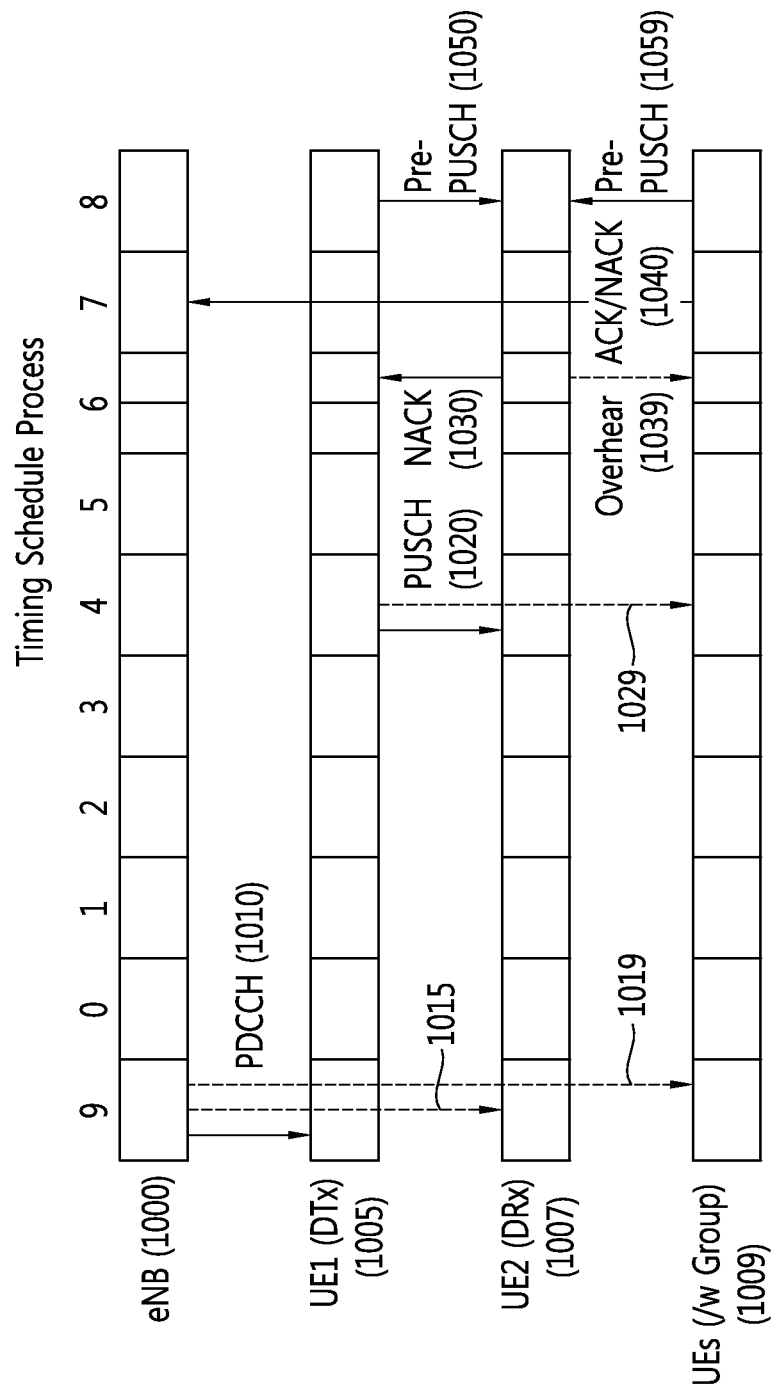

FIG. 10 illustrates a case in which TDD configuration is 6 according to an example of the present invention. In FIG. 10, D2D group UE based cooperative HARQ is described.

Referring to FIG. 10, the eNB transmits UL scheduling information required for the UE1 transmitting data to the UE2 in the sub-frame #9 and transmits UL scheduling information required for the UE2 transmitting the ACK/NACK feedback signals to the UE1 through the PUCCH in the sub-frame #6. In addition, the eNB transmits UL scheduling information required for the group UEs transmitting the data to the eNB in the sub-frame #7 1010, 1015, and 1019. According to the present invention, downlink transmission may be performed in the sub-frames #0, #1, #5, #6, and #9 in the case where the TDD configuration is 6 and an HARQ operation may be performed through the PUSCH and the PUCCH in uplink ACK/NACK timing kth sub-frames determined in accordance with the sub-frames #0, #1, #5, #6 , and #9 in the case where the TDD configuration is 6.

The UE1 that received the PDCCH in the sub-frame #9 transmits PUSCH data to the UE2 in the sub-frame #4 and the group UEs overhear the signal 1020 and 1029. The UE2 transmits the HARQ ACK/NACK feedback signals to the UE1 in the sub-frame #6 in accordance with whether the PUSCH data is correctly received 1030. Then, the group UEs overhear the signal 1039.

The ACK feedback signal is transmitted to the eNB in the sub-frame #7 when the group UEs correctly received the PUSCH data in the sub-frame #4 and the NACK feedback signal is transmitted to the eNB in the sub-frame #7 when the group UEs did not correctly receive the PUSCH data in the sub-frame #4 1040.

The UE1 that received the NACK feedback signal from the UE2 retransmits the PUSCH data to the UE2 in the sub-frame #8 1050. At this time, the group UEs also retransmit the PUSCH data to the UE2 in the sub-frame #8 1059. According to the present invention, after the UE2 overhears the NACK feedback signal to the UE1 in the sub-frame #6 1039, the group UEs cooperatively retransmit the PUSCH data together with the UE1 in the sub-frame #8 1050 and 1059.

As described above, the group UEs receive the C-RNTI (or the D2D RNTI) for decoding the PDCCH when a group for a D2D service is formed to decode the PDCCH transmitted to the UE1 and the UE2. Therefore, downlink allocation indices for scheduling allocations to the PDCCH according to the present invention may be determined so that transmission points in time (sub-frames) of the uplink ACK/NACK feedback signals and reliability of the ACK/NACK feedback signals may be determined.

Figure 11:
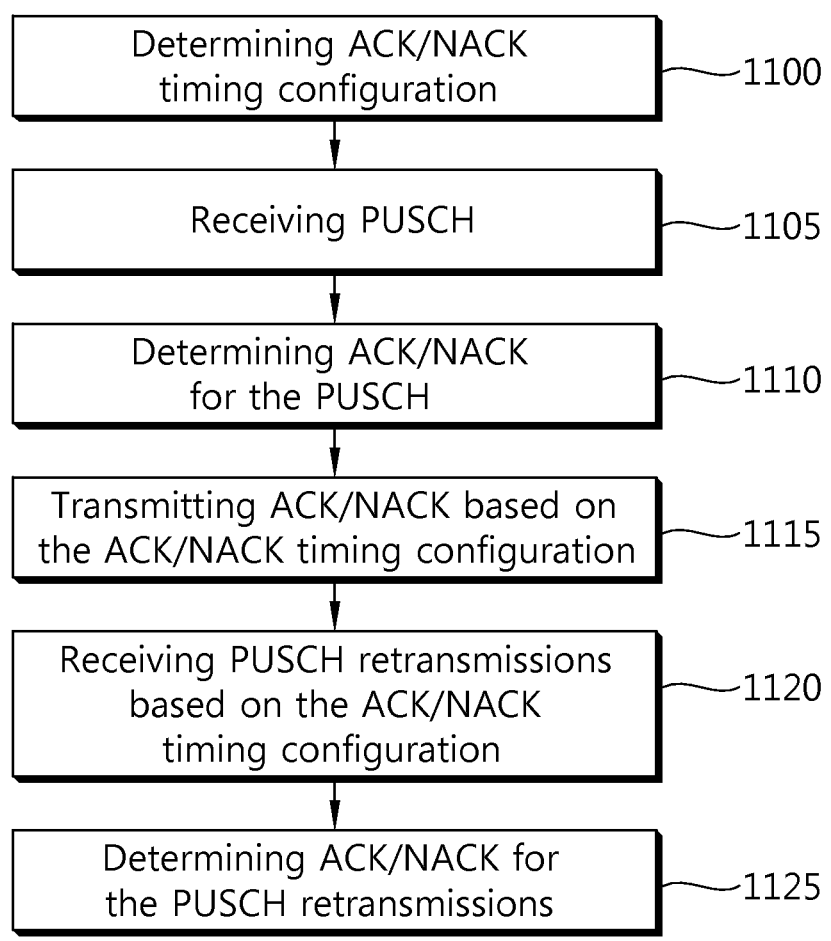
FIG. 11 is a signal flowchart schematically illustrating processes of retransmitting uplink at a point in time determined in accordance with TDD configuration according to the present invention.

FIG. 11 is a signal flowchart schematically illustrating processes of performing cooperative HARQ according to the present invention.

Referring to FIG. 11, the UE1, the UE2, and the group UEs receive the TDD configuration 1100. The TDD configuration includes information on time for the UEs that perform the D2D communications to transmit the ACK/NACK feedback signals through the PUSCH and the PUCCH in consideration of downlink transmission, for example, the PDCCH including scheduling of the eNB. According to the present invention, for example, the information on time to transmit the ACK/NACK feedback signals through the PUSCH and the PUCCH is determined using the uplink ACK/NACK timing k for the TDD. The UEs that perform the D2D service may receive the PDCCH transmitted from the eNB in an arbitrary sub-frame among sub-frames in which downlink is transmitted, which are determined in accordance with a determined point in time of the configured TDD configuration, for example, the configured TDD configuration. At this time, the UEs that perform the D2D communications may recover the PDCCH through a shared RNTI.

The D2D UEs may transmit and receive the PUSCH data in sub-frames where uplink transmission may be performed, which are determined in accordance with the configured TDD configuration. For example, D2D receiving UEs receive the PUSCH from D2D transmitting UEs in the uplink transmitting sub-frames determined in accordance with the TDD configuration 1105. Then, the D2D receiving UEs determine whether the received PUSCH data is erroneous 1110. At this time, the PUSCH data transmitted from the D2D transmitting UEs is overheard by the group UEs through the shared RNTI.

On the other hand, the D2D receiving UEs transmit the ACK/NACK feedback signals for the received PUSCH to the D2D transmitting UEs in the uplink transmitting sub-frames 1115. At this time, the D2D transmitting UEs are recognized in the available uplink sub-frames. The D2D transmitting UEs check the ACK/NACK signals and determine whether HARQ is to be performed. On the other hand, the group UEs may determine the ACK/NACK feedback signals for the overheard PUSCH and may transmit the determined response signal to the eNB or the D2D transmitting UEs.

Then, the D2D receiving UEs receive PUSCH HARQ from the D2D transmitting UEs in the uplink transmitting sub-frames determined in accordance with the TDD configuration 1120.

As described above, the group UEs configured by the UEs that use the same application for the D2D service may be overheard through the shared RNTI obtained when the PDCCH, the PUSCH, and the PUCCH form a group. Therefore, the ACK/NACK feedback signals of the PUSCH may be determined so that it may be determined whether to retransmit the PUSCH. The PUSCH HARQ is performed in the uplink transmitting sub-frames determined in accordance with the TDD configuration. Therefore, the D2D receiving UEs may receive the PUSCH HARQ transmitted from the group UEs in the uplink transmission sub-frames determined in accordance with the TDD configuration.

Therefore, the D2D receiving UEs check the PUSCH HARQ to determine the ACK/NACK feedback signals 1125, in which HARQ data transmitted from the group UEs and the D2D transmitting UEs is checked. Therefore, reliability of the data of the D2D receiving UEs may be correctly supported.

Figure 12:
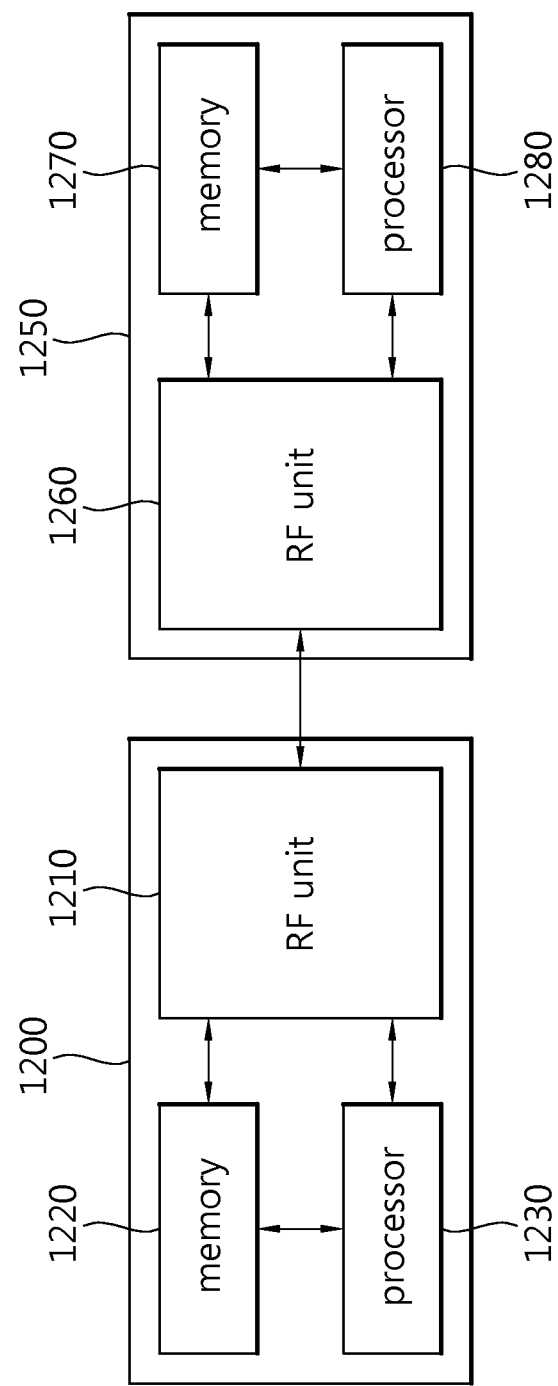
FIG. 12 is a view schematically illustrating a structure of a wireless communication system according to the present invention.

FIG. 12 is a block diagram schematically illustrating a structure of a wireless communication system according to the present invention.

Referring to FIG. 12, a terminal 1200 includes a radio frequency (RF) processing unit 1210, a memory 1220, and a processor 1230. The RF processing unit 1210 is connected to the processor 1230 and transmits and receives an RF.

The processor 1230 as an entity for performing a function, a process, and a method according to the present invention performs the operations described in FIGS. 2 to 10 according to the present invention. In particular, the processor 1230 according to the present invention receives configuration information and resource allocation information instructed by a network that is an upper system to support simultaneous or partial access to the D2D communications and the cellular communications in accordance with capability of UEs. At this time, the processor 1230 may perform communications with another D2D UE by detecting link that performs the D2D communications without signaling of the eNB.

In particular, according to the present invention, the processor 1230 checks allocated resources for performing the D2D communications. According to the present invention, resource allocation information of the PUSCH and the PUCCH for performing the D2D communications and transmission points in time of the PUSCH and the PUCCH in accordance with the TDD configuration are checked and determined (calculated).

In addition, according to the present invention, the processor 1230 obtains identification information of a sharing group, for example, information on the C-RNTI to perform blind decoding at a specific point of the PDCCH for cooperative HARQ processing. The C-RNTI may be obtained when control information on generation of D2D groups is received or may be received when resources are allocated in accordance with D2D link connection configuration. Here, obtaining the C-RNTI may include the UEs that belong to the sharing group obtaining C-RNTIs each other.

According to another example of the present invention, an additional distinguished RNTI for the D2D service may be used. The UEs in the sharing group may receive the PDCCH in a sub-frame position determined through the RNTI defined for the D2D service and may support the D2D service.

For example, when the processor 1230 is configured in each of UEs that belong to the sharing group, the processor 1230 receives data transmitted through the PUSCH through the resources allocated through the RNTI shared for the D2D service, overhears the ACK/NACK feedback signals for the received data, determines sub-frames in which uplink transmission may be performed, which are determined in accordance with the configured TDD configuration, and retransmits the previously overheard data to receiving UEs in sub-frames that are the same points in time as transmitting UEs that transmit the PUSCH. That is, the processor 1230 supports a cooperative HARQ operation together with the transmitting UEs that transmit the PUSCH. Here, the memory 1220 may store overheard data, for example, information on and resource allocation to the shared C-RNTI for the cooperative HARQ operation and D2D service data. In addition, the memory 1220 stores information on the TDD configuration to support the processor 1230 to receive and transmit the PDCCH and the PUSCH in a sub-frame that is a determined point in time.

As another example, when the processor 1230 is configured in each of D2D link connected UEs, the processor 1230 transmits and receives data through the PUSCH by resources (reception of the PDCCH) allocated for the D2D service. The processor 1230 may transmit and receive the ACK/NACK feedback signals for the data. In addition, the processor 1230 receives and re-receives data transmitted from terminals that belong to the sharing group in the sub-frames that are the same points in time as the UEs that transmit the PUSCH to correctly determine whether the D2D data is received and to determine whether to perform HARQ. That is, information on the TDD configuration is checked so that data is received and the ACK/NACK feedback signals are transmitted in determined sub-frames. That is, the D2D link connected transmitting and receiving UEs store the information on the TDD configuration and support the processor 1230 to receive and transmit the PDCCH and the PUSCH in the sub-frames that are the determined points in time.

As described above, the memory 1220 is connected to the processor 1730 and includes information items for supporting all the operations of the processor 1230.

On the other hand, a network 1250 includes an RF processing unit 1260, a processor 1280, and a memory 1270. The RF processing unit 1260 is connected to the processor 1280 and transmits and receives an RF. Here, the network may be configured so that a partial entity of a base station and a partial entity of an upper core network are partially supported in accordance with operations thereof.

The processor 1280 of the network according to the present invention as an entity for performing a function, a process, and a method according to the present invention performs the operations described in FIGS. 2 to 10 according to the present invention. That is, the processor 1280 allocates resources in consideration of capability information, service states, and channel states of the UEs in a cell. In particular, according to the present invention, the processor 1280 may distinguish resources for the D2D communications from the sub-frames for the cellular communications to allocate the resources. In addition, according to the present invention, the sharing group for cooperatively transmitting and receiving the D2D data is defined and information on the sharing group is transmitted to the corresponding UEs. At this time, the C-RNTI for the sharing group is transmitted when the group is formed or an additional RNTI is configured to be informed to the corresponding terminals. In addition, according to the present invention, the information on the TDD configuration is provided to the D2D terminals. Therefore, at a determined point in time, the PDCCH is transmitted so thate the corresponding terminals may correctly receive the allocated resources.

The memory 1770 is connected to the processor 1780 and includes information items for supporting all the operations of the processor 1780.

In a wireless communication environment where a plurality of terminals and communication devices coexist, service demands of the respective terminals may be maximally satisfied through D2D link. That is, transmission, reception, and HARQ of data on requested services of the corresponding terminals are maximally guaranteed. Therefore, rapidly increasing demands on wireless data traffic and performance of an entire system may be maximally supported. In particular, at least one terminal that uses the same application forms a group so that reliability of data HARQ may be guaranteed by uplink channels among the D2D terminals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means. In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of performing, by a device to device (D2D) terminal, hybrid automatic repeat request (HARQ) in a wireless communication system, the method comprising:
   overhearing a physical downlink control channel (PDCCH) transmitted from a base station to a D2D transmitting terminal and decoding the PDCCH based on a cell radio network temporary identifier (C-RNTI) corresponding to the D2D transmitting terminal,
   wherein the PDCCH includes an uplink resource for a physical uplink control channel (PUCCH) and an uplink resource for a physical uplink shared channel (PUSCH);
   overhearing a PUSCH including D2D data transmitted from the D2D transmitting terminal to a D2D receiving terminal based on the PDCCH;
   overhearing a PUCCH transmitted from the D2D receiving terminal to the D2D transmitting terminal based on the PDCCH, the PUCCH including an acknowledgement/not-acknowledgement (ACK/NACK) message with respect to the PUSCH including the D2D data; and
   transmitting the D2D data in accordance with the ACK/NACK message to the D2D receiving terminal when the ACK/NACK message indicates NACK for performing cooperative HARQ,
   wherein the D2D terminal, the D2D transmitting terminal and the D2D receiving terminal are included in a D2D group, and
   wherein each terminal belonging to the D2D group knows the C-RNTI of each of the other terminals belonging to the D2D group such that each terminal is capable of overhearing signals associated with the other terminals.

2. The method of claim 1, wherein the D2D receiving terminal obtains the C-RNTI corresponding to the D2D transmitting terminal when D2D connection is configured with the D2D transmitting terminal.

3. The method of claim 1, wherein the D2D terminal obtains the C-RNTI corresponding to the D2D transmitting terminal when the D2D group is formed.

4. The method of claim 1, further comprising:
   obtaining resource information of a physical uplink shared channel (PUSCH) and a physical uplink control channel (PUCCH) for the D2D communications through the PDCCH.

5. The method of claim 4, wherein the D2D data is transmitted through the PUSCH and the ACK/NACK message is transmitted through the PUCCH.

6. The method of claim 5, further comprising:
   checking the D2D data transmitted through the PUSCH; and
   transmitting a response signal to the data to the D2D transmitting terminal or the base station through the PUCCH.

7. The method of claim 1, further comprising:
   checking whether the D2D data is retransmitted by the D2D transmitting terminal.

8. The method of claim 1, further comprising:
   obtaining configuration information on whether a frequency division duplex (FDD) method or a time division duplex (TDD) method is used from the base station,
   wherein the D2D data and the ACK/NACK message are transmitted in different sub-frames determined in accordance with the used configuration information.

9. The method of claim 8, wherein if the FDD method is configured, the PDCCH is overheard in an nth sub-frame, the D2D data is overheard in an $(n+4)^{th}$ sub-frame, the ACK/NACK message is overheard in an $(n+8)^{th}$ sub-frame and the D2D data in accordance with the ACK/NACK message is transmitted in an $(n+12)^{th}$ sub-frame.

10. The method of claim 8, wherein the TDD method is configured, sub-frames for uplink transmission are determined according to a specific TDD configuration selected among a plurality of TDD configurations, and
    wherein the PDCCH is overheard in a first sub-frame among the sub-frames, the D2D data is overheard in a second sub-frame among the sub-frames in which uplink transmission is performed after the first sub-frame, the ACK/NACK message is overheard in a third sub-frame among the sub-frames in which uplink transmission is performed after the second sub-frame and the D2D data in accordance with the ACK/NACK message is transmitted in a fourth sub-frame among the sub-frames in which uplink transmission is performed after the third sub-frame.

11. The method of claim 10, wherein if an index of the specific TDD configuration is 5, the cooperative HARQ is not performed.

12. A method of receiving device to device (D2D) data by a D2D receiving terminal, the method comprising:
    overhearing a physical downlink control channel (PDCCH) transmitted from a base station to a D2D transmitting terminal and decoding the PDCCH based on a cell radio network temporary identifier (C-RNTI) corresponding to the D2D transmitting terminal,
    wherein the PDCCH includes an uplink resource for a physical uplink control channel (PUCCH) and an uplink resource for a physical uplink shared channel (PUSCH);
    receiving, from the D2D transmitting terminal, a PUSCH including the D2D data based on the PDCCH;
    transmitting a PUCCH based on the PDCCH to the D2D transmitting terminal, the PUCCH including an acknowledgement/not-acknowledgement (ACK/NACK) message with respect to the D2D data; and
    re-receiving the D2D data in accordance with the ACK/NACK message from the D2D transmitting terminal and at least one group D2D terminal respectively,
    wherein the D2D receiving terminal, the D2D transmitting terminal and the at least one group D2D terminal are included in a D2D group, and
    wherein each terminal belonging to the D2D group knows the C-RNTI of each of the other terminals belonging to the D2D group such that each terminal is capable of overhearing signals associated with the other terminals.

13. The method of claim 12, wherein the at least one group D2D terminal obtains the C-RNTI corresponding to the D2D transmitting terminal when the D2D group is formed.

14. The method of claim 12, further comprising:
obtaining configuration information on whether a frequency division duplex (FDD) method or a time division duplex (TDD) method is used from the base station,
wherein the D2D data and the ACK/NACK message are transmitted in different sub-frames determined in accordance with the used configuration information.

\* \* \* \* \*